Jan. 3, 1950      J. L. CRISWELL      2,493,282
CRANE HOOK LOCK NUT
Filed Aug. 9, 1946
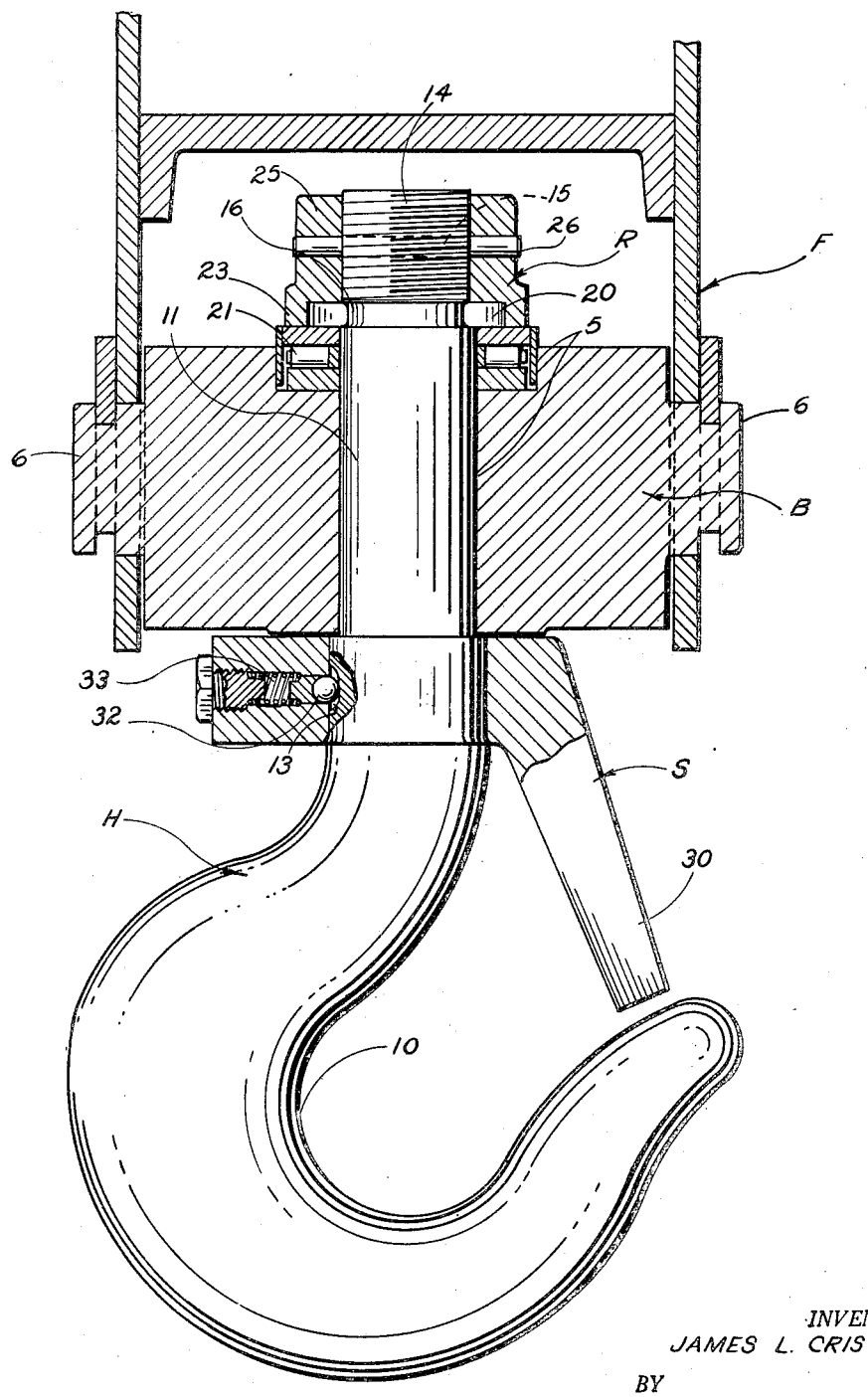
INVENTOR.
JAMES L. CRISWELL
BY
Richey Watts
ATTORNEYS

Patented Jan. 3, 1950

2,493,282

UNITED STATES PATENT OFFICE

2,493,282

CRANE HOOK LOCK NUT

James L. Criswell, Massillon, Ohio, assignor to Republic Steel Corporation, Cleveland, Ohio, a corporation of New Jersey Application August 9, 1946, Serial No. 689,413

2 Claims. (Cl. 59—95)

The present invention relates in general to lifting and carrying means and more particularly to a novel crane hook assembly.

Industrial hooks, such as crane hooks, have heretofore commonly been supported by means of threads on the hook shanks. In use relatively heavy loads are repeatedly imposed upon such hooks with the result that their threads or those of the nuts or other parts engaging them are soon distorted or stripped and the hooks become useless. There is, of course, danger of dropping the load and injuring workmen and materials when a hook having weak supporting threads is employed. Efforts have been made by many others to overcome this difficulty and meet the long standing demand for economical and effective hook mounting and retaining means which would greatly prolong the useful life of industrial hooks. To the best of my knowledge, however, these efforts have all failed and the novel hook assembly of this invention constitutes the first complete response to this demand.

In accordance with my invention, the hooks are not supported by means of threads, but they still have all the flexibility in use of any hooks heretofore known.

The hook assembly of my invention is not particularly complicated and is easily manufactured and assembled, and is economical and easy to use. The differences between hooks of this invention and those heretofore known are not numerous but are extremely critical so far as usefulness and economy are concerned, and spell the difference between success and failure. One feature in particular which enables the safe and economical use of crane hooks with a minimum of effort on the part of the operator, is an automatic safety latch hereinafter described in detail.

This invention will be better understood by referring to the drawing accompanying and forming a part of this specification, which is a side elevational view partly in section of a hook assembly embodying this invention.

In general, the assembly of this invention comprises an apertured block or beam, a hook having a shank portion disposed within the block or beam, and means for preventing substantially any movement, except rotational movement, of said hook with respect to said block.

The illustrated hook assembly more specifically comprises an apertured block B, a hook H, hook retaining means R for preventing substantially any movement but rotational movement of the hook with respect to the block, and safety means S for substantially closing the hook.

The block B of this assembly is a metal piece having a centrally disposed cylindrical recess 5 of relatively large diameter in the upper portion of the said block, and a centrally disposed aperture of substantially reduced diameter in the central and lower portions of the block. The block is provided with trunnions 6 disposed on opposite sides of the block at right angles to said aperture. By means of said trunnions the block is carried by metal frame yoke F.

The hook is a solid, cylindrical, metal member having a bight 10 and a shank 11. The bight is gently tapered from a point adjacent to the shank to a maximum cross section at approximately its mid-section, and is tapered from there to its blunt end or nose of reduced cross section. The portion of shank 11 adjacent to the bight is provided with a shallow elliptical recess or depression 13 disposed diametrically opposite to the blunt end of the bight. The end portion of the shank bears threads 14 and is provided with a radially disposed cylindrical aperture 15, which extends transversely through said portion of the hook. A neck 16 is provided in the portion of the shank adjacent to the threaded end of the shank.

The retaining means R comprises essentially a split metal ring or washer 20 disposed partially within the annular groove defined by neck 16, and in contact with the annular shoulders defining said neck. This ring is supported by means of an annular thrust bearing assembly 21 partially disposed within recess opening 5 of block B. It is retained in position by an annular recess 23 in the lower surface of an apertured castle nut 25, which threadwise engages the shank 11 and prevents movement of ring 20 away from said shank. A metal pin 26 is disposed within aperture 15 of the shank and in the apertures of the castle nut, assuring constant engagement of the hook and the nut and retention of the hook in position with respect to block B.

Safety means S includes latch lever 30 comprising an elbow shaped metal member having an apertured portion of substantially the diameter of the portion of the hook shank adjoining the bight, and having a second aperture of substantially smaller diameter disposed at substantially right angles to said large aperture and a ball or detent 32 and spring 33 disposed within said smaller aperture. The lever 30 is disposed to prevent loading or unloading of the hook by blocking the opening of the bight. The spring mounted ball 32 is disposed firmly against the shank of the hook within the elliptical recess 13 to oppose rotational movement of the latch with respect to the hook to open the hook.

The illustrated assembly is made by slipping the safety latch 30 upon the shank of the hook and disposing the central portion of the shank within the recess 5 of the block so that the neck portion 16 and the threaded end of the shank are disposed above the said block and the latch 30 is disposed between the lower portion of the block and bight 10. The thrust bearing assembly 21 is then slipped over the end of the shank 11 and seated in the enlarged upper portion of the aperture of the block. The two semi-circular portions of the split ring 20 are fitted together to enclose the neck portion 16 of the shank and to describe an annular flange-like projection of the shank. The retaining walls defined by the recess 23 are then disposed around the split ring in tight fitting engagement with the split ring, as the castle nut 25 is threaded onto the hook shank until the split ring 20 is firmly pressed into the neck portion 16 between the said nut and the roller bearing assembly and the apertures of the nut are in register with aperture 15 of the shank. Finally, pin 26 is driven into said apertures to prevent relative movement of the nut and shank. In this form the assembly is ready for use and when loading is to be accomplished, the safety latch 30 is pushed around the shank, leaving the hook open. The latch is readily returned to position to close the hook by an easy movement of the hand, and movement of the latch is automatically stopped when the hook is closed by the action of the spring mounted ball, which is received in the recess 13 as such closure is made. The hook may be easily rotated with respect to the block on the rollers of the roller bearing assembly 21.

Those skilled in the art will appreciate that various modifications may be made of the assembly described and illustrated without departing from this invention or the scope of the appended claims. The shank, for instance, may be provided with several necked portions and split rings may be disposed in each of these and may be retained by other means than the illustrated castle nut-retaining ring combination. Also, the dimensions of the neck portions and the split rings may vary considerably from those indicated above without imposing limitations upon the usefulness or effectiveness of the hook of the assembly. Moreover, I contemplate the use of a hook having a flanged shank which will serve the same purpose as the illustrated necked shank and split ring but will not require a retaining nut.

Having thus described the present invention so that others skilled in the art may understand and practice the same, I state that what I desire to secure by Letters Patent is defined in what is claimed.

What is claimed is:

1. A crane hook assembly comprising a block having an aperture extending upwardly therethrough and a recess about the upper end of said aperture, a hook having a cylindrical shank extending up through said aperture and recess and having threads on the projecting upper end thereof and a groove extending around the shank above said block, a split washer seated in and projecting from said groove, a nut on the threaded portion of the shank and having a depending skirt to encircle the outer periphery of said washer and hold the washer parts in assembled position in said groove, and an annular thrust bearing in said recess about said shank, said washer resting on said bearing and solely supporting the hook and any load thereon.

2. A crane hook assembly comprising a block having an aperture extending upwardly therethrough and a recess about the upper end of said aperture, a hook having a cylindrical shank extending up through said aperture and recess and having threads on the projecting upper end thereof and a groove extending around the shank above said block, a split washer seated in and projecting from said groove, a nut on the threaded portion of the shank and having a depending skirt to encircle the outer periphery of said washer and hold the washer parts in assembled position in said groove, a safety latch encircling said shank adjacent to the lower side of said block and extending toward the nose of the hook, and a spring detent in said latch to seat in a depression in the shank, an annular thrust bearing in said recess about said shank, said washer resting on said bearing and solely supporting the hook and load thereon.

JAMES L. CRISWELL.

REFERENCES CITED

The following references are of record in the file of this patent:

UNITED STATES PATENTS

| Number | Name | Date |
|---|---|---|
| 1,051,114 | Johnson | Jan. 21, 1913 |
| 1,276,471 | Wilson | Aug. 20, 1918 |
| 1,676,167 | Sprain | July 3, 1928 |
| 2,027,376 | Grau | Jan. 14, 1936 |